United States Patent
Katz et al.

(10) Patent No.: US 10,672,118 B2
(45) Date of Patent: Jun. 2, 2020

(54) METHOD AND APPARATUS FOR DETECTING SURFACE FEATURES

(71) Applicant: The Boeing Company, Chicago, IL (US)

(72) Inventors: Alan R. Katz, Bellevue, WA (US); Stephen J. Bennison, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 15/852,720

(22) Filed: Dec. 22, 2017

(65) Prior Publication Data

US 2019/0197681 A1    Jun. 27, 2019

(51) Int. Cl.
*G06T 7/00* (2017.01)
*G06T 17/20* (2006.01)
*G06T 7/11* (2017.01)
*G06F 17/16* (2006.01)
*G06F 17/18* (2006.01)
(Continued)

(52) U.S. Cl.
CPC ............ *G06T 7/0008* (2013.01); *G06F 17/16* (2013.01); *G06F 17/18* (2013.01); *G06K 9/00201* (2013.01); *G06T 7/11* (2017.01); *G06T 15/04* (2013.01); *G06T 17/20* (2013.01); *G06K 9/34* (2013.01); *G06K 9/4642* (2013.01); *G06T 2207/10028* (2013.01); *G06T 2207/30108* (2013.01); *G06T 2207/30248* (2013.01)

(58) Field of Classification Search
CPC ......... G06T 7/0008; G06T 7/11; G06T 15/04; G06T 17/20; G06F 17/16; G06F 17/18
See application file for complete search history.

(56) References Cited

U.S. PATENT DOCUMENTS 7,542,135 B2    6/2009   Mead et al.
2016/0138914 A1*  5/2016   Chang .................. G06K 9/00
                                                702/167
(Continued)

FOREIGN PATENT DOCUMENTS

EP         2897100        7/2015

OTHER PUBLICATIONS

Jovančević et al, "3D Point Cloud Analysis for Detection and Characterization of Defects on Airplane Exterior Surface", Oct. 17, 2017, J Nondestruct Eval (2017) 36:74, 17 pages (Year: 2017).*
(Continued)

*Primary Examiner* — David F Dunphy
(74) *Attorney, Agent, or Firm* — Haynes and Boone, LLP

(57) ABSTRACT

A method and apparatus for detecting a feature on a surface. A mesh comprising a plurality of mesh elements is generated using surface data generated for a surface region. The plurality of normal vectors is computed for the plurality of mesh elements. A distribution for the plurality of normal vectors is generated. A dominant subset of the plurality of mesh elements is identified in which a Z component of a corresponding normal vector for each mesh element of the dominant subset is in substantially a first direction. Z components of a portion of the plurality of normal vectors corresponding to a remaining subset of the plurality of mesh elements are analyzed to determine whether the feature is present within the surface region.

17 Claims, 10 Drawing Sheets

(51) Int. Cl.
*G06T 15/04* (2011.01)
*G06K 9/00* (2006.01)
*G06K 9/46* (2006.01)
*G06K 9/34* (2006.01)

(56) References Cited

U.S. PATENT DOCUMENTS

2016/0203387 A1   7/2016  Lee et al.
2018/0144535 A1*  5/2018  Ford ..................... G06T 15/005
2018/0326591 A1* 11/2018  Hausler .............. G05B 19/4097

OTHER PUBLICATIONS

Peternell, "Developable surface fitting to point clouds," Computer Aided Geometric Design 21 (2004), pp. 785-803.
Broeksma et al., "Method for Detecting and Measuring Fracture Plane Orientation in the Condroz Sandstone with 3D Terrestrial LIDAR", Oct. 31, 2016, pp. 1-56, XP055581610, Bachelor Thesis, Faculty of Civil Engineering and Geosciences, TU Delft.
Jovancevic et al.,"3D Point Cloud Analysis for Detection and Characterization of Defects on Airplane Exterior Surface", Oct. 17, 2017, vol. 36, No. 74, pp. 1-17, XP036368940, J Nondestruct Eval, Springer Science+Business Media, LLC.

* cited by examiner

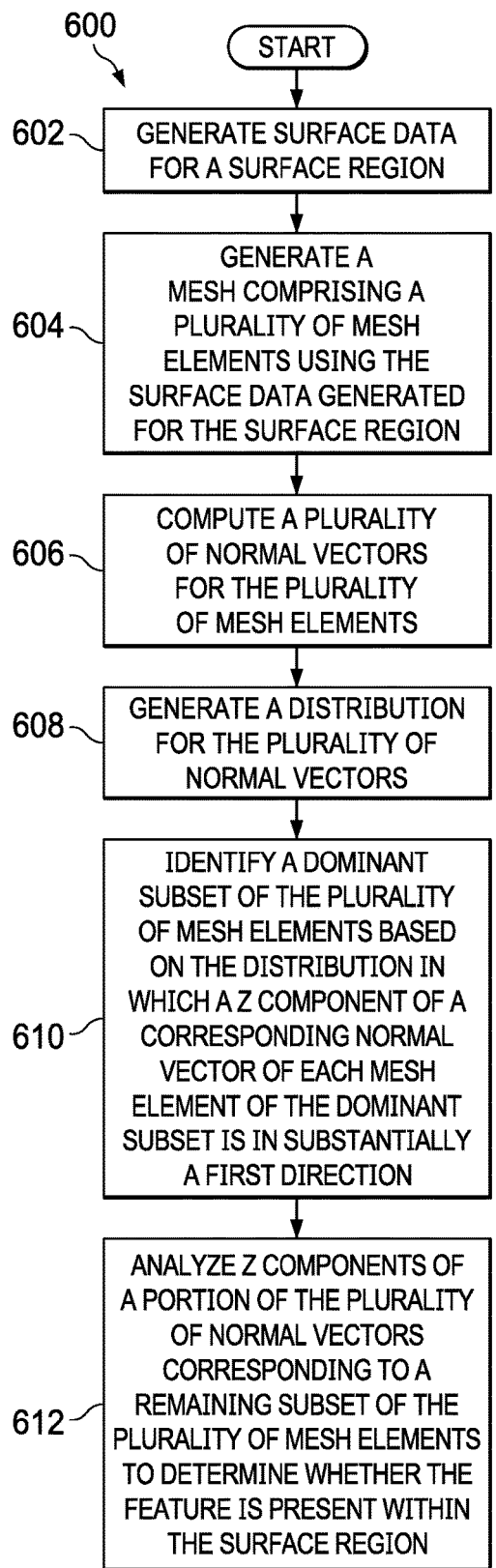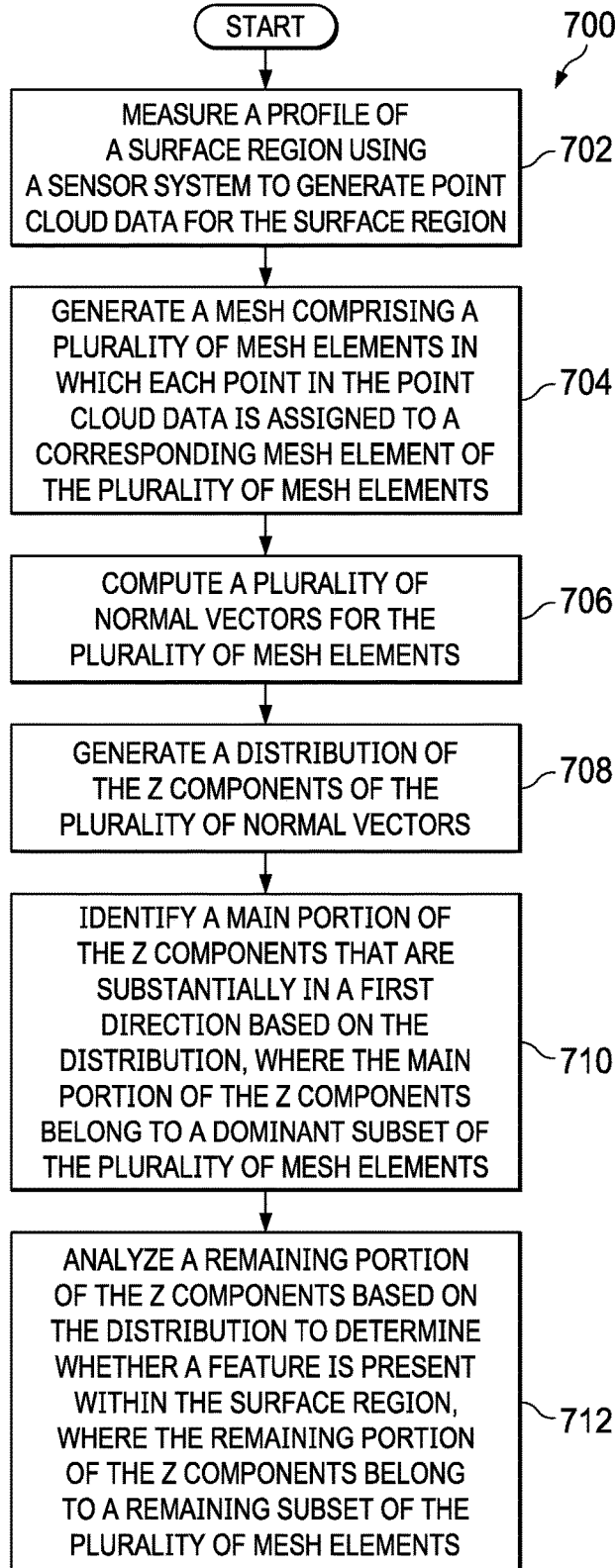
Fig. 6
Fig. 7

US 10,672,118 B2

METHOD AND APPARATUS FOR DETECTING SURFACE FEATURES

FIELD

The present disclosure relates generally to detecting surface features, and more particularly, to a method and apparatus that uses surface normals to detect and measure substantially conical holes and to detect surface texture features.

BACKGROUND

During the manufacturing of large, complex structures, systems and processes for inspection are oftentimes required. As one example, the manufacturing and assembly of an aircraft may require various inspection processes of the surfaces of structures. For example, during the manufacturing of a fuselage for an aircraft, it may be necessary to measure and inspect holes that are drilled into fuselage panels that make up the fuselage prior to the installation of fasteners within these holes. As another example, it may be necessary to inspect the surface of certain fuselage structures to determine whether any undesired inconsistencies, such as scratches and dents, are present. Currently, these types of inspections are performed manually. But manual inspection may be time-consuming and require more effort than desired. Further, in many instances, manual inspection may not provide the level of accuracy desired. Thus, systems and methods for improving the process of surface inspection are needed.

SUMMARY

In one example embodiment, a method for detecting a feature on a surface is provided in which the method is implemented using a computer system. A mesh comprising a plurality of mesh elements is generated using surface data generated for a surface region. The plurality of normal vectors is computed for the plurality of mesh elements. A distribution for the plurality of normal vectors is generated. A dominant subset of the plurality of mesh elements is identified in which a Z component of a corresponding normal vector for each mesh element of the dominant subset is in substantially a first direction. Z components of a portion of the plurality of normal vectors corresponding to a remaining subset of the plurality of mesh elements are analyzed to determine whether the feature is present within the surface region.

In another example embodiment, an apparatus comprises a sensor system and a computer system. The sensor system measures a profile of a surface region to generate surface data. The computer system receives the surface data; generates a mesh comprising a plurality of mesh elements using the surface data generated for a surface region; computes a plurality of normal vectors for the plurality of mesh elements; generates a distribution for the plurality of normal vectors; identifies a dominant subset of the plurality of mesh elements in which a Z component of a corresponding normal vector of each mesh element of the dominant subset is in substantially a first direction; and analyze Z components of a portion of the plurality of normal vectors corresponding to the remaining subset of the plurality of mesh elements to determine whether the feature is present within the surface region.

In yet another example embodiment, a method for detecting a feature on a surface is provided. A surface of an aircraft structure is scanned using a sensor system to generate point cloud data. A mesh comprising a plurality of mesh elements is generated in which each point in the point cloud data is assigned to a mesh element in the plurality of mesh elements. A plurality of normal vectors is computed for the plurality of mesh elements. A distribution of Z components is generated for the plurality of normal vectors. A main portion of the Z components that are substantially in a first direction is identified based on the distribution. A remaining portion of the Z components is analyzed based on the distribution to determine whether the feature is present within the surface region. A substantially conical hole is detected at a region of the mesh when substantially all corresponding Z components for the region are substantially in a second direction that is not the first direction. A surface texture feature is detected at the region of the mesh when the region is associated with a random and varied distribution of Z components.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is a flowchart illustration of a process for computing and analyzing normal vectors for a surface region in accordance with an example embodiment.

FIG. 7 is a flowchart illustration of a process for detecting surface texture features on a surface in accordance with an example embodiment.

DETAILED DESCRIPTION

The example embodiments described below provide various methods and related apparatuses for detecting features of interest on surfaces of structures using surface normals. In particular, the example embodiments provide various methods and related apparatuses for automating the detection and measurement of substantially conical holes that have been formed in surfaces with a desired level of accuracy. Further, the example embodiments provide various methods and related apparatuses for automating the detection of undesired surface texture features on surfaces with a desired level of accuracy.

By using surface normals to detect and measure substantially conical holes and to detect undesired surface texture features, the overall time required for the inspection of surfaces may be reduced. For example, the inspection system and processes described by the various illustrative examples below for performing the detection of features of interest on surfaces takes advantage of the full three-dimensional geometric content of a scan by a sensor system, such as a profilometer as well as the fact that a small enough region of a curved surface may be considered approximately flat. The inspection system and processes described compute surface normals for the surface and use the surface normals to quickly and accurately detect surface features of interest.

Figure 1:
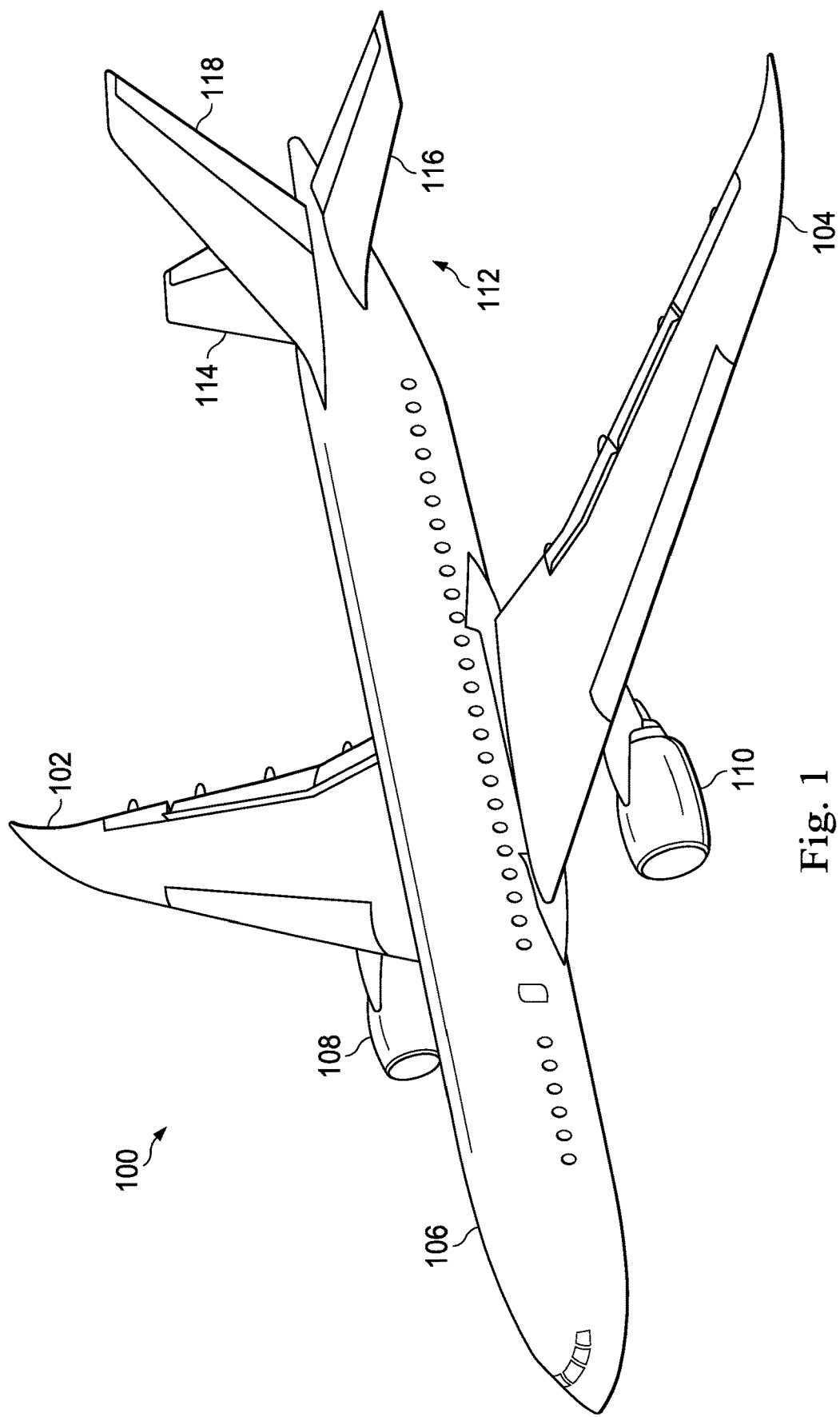
FIG. 1 is an illustration of a perspective view of an aircraft in accordance with an example embodiment.

With reference now to the figures, FIG. 1 is an illustration of an aircraft, depicted in accordance with an illustrative embodiment. Aircraft 100 includes wing 102 and wing 104 attached to fuselage 106. Aircraft 100 includes engine 108 attached to wing 102 and engine 110 attached to wing 104. Aircraft 100 also includes tail section 112. Horizontal stabilizer 114, horizontal stabilizer 116, and vertical stabilizer 118 are attached to tail section 112.

Aircraft 100 is an example of an aircraft manufactured using methods and systems for automating the process of inspecting surfaces to detect certain features of interest in accordance with the illustrative embodiments described below. For example, without limitation, fuselage 106 may be an example of one implementation of a structure built using an automated process for the inspection of features of interest, such as substantially conical holes and undesired surface texture features. For example, inspection system 202 described in FIG. 2 below may be used to perform the measurement of countersunk holes drilled into fuselage panels that make up the fuselage 106 and to perform the detection of surface inconsistencies on the surfaces of these fuselage panels.

Figure 2:
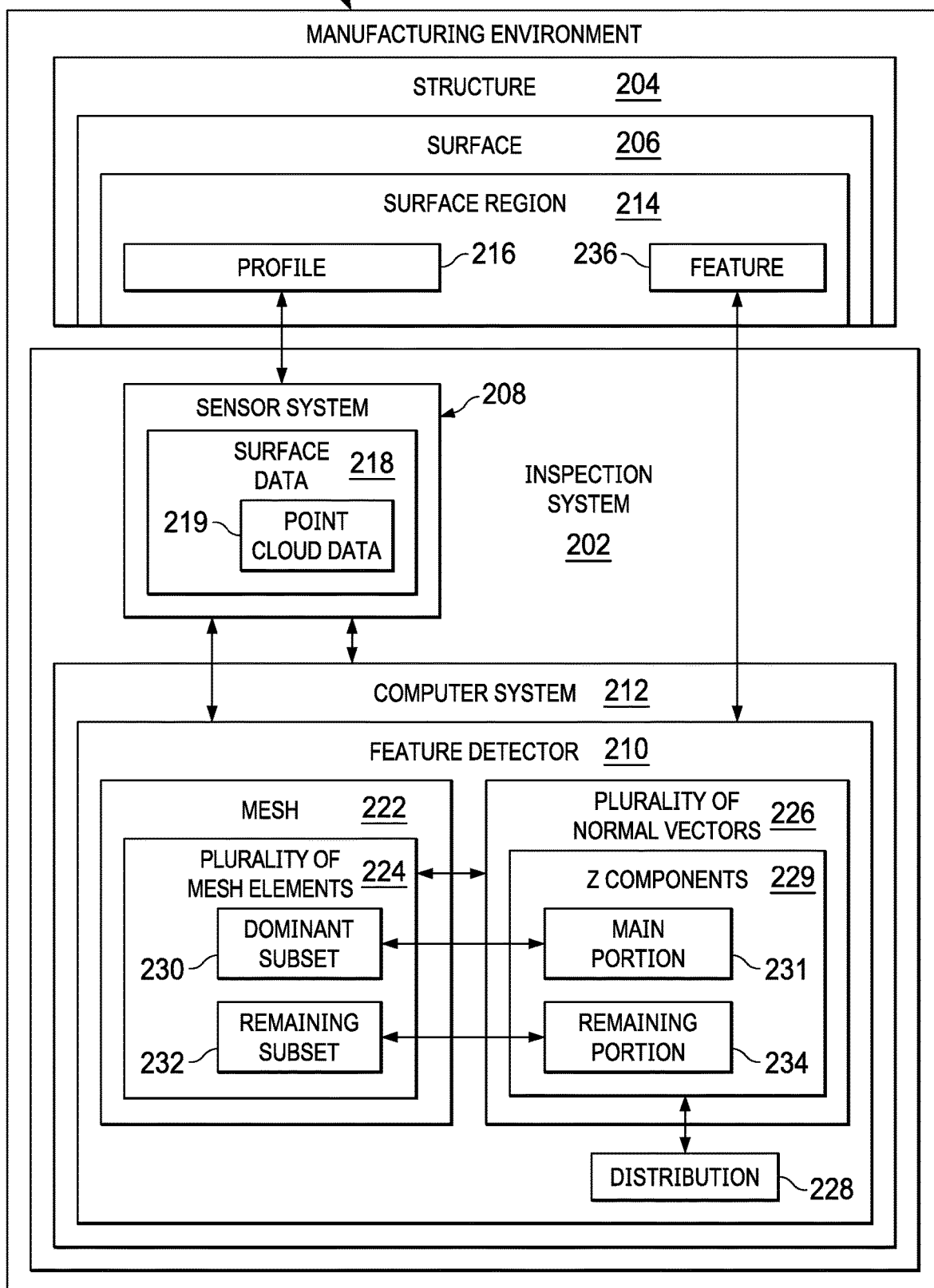
FIG. 2 is a block diagram of a manufacturing environment within which an inspection system is used in accordance with an example embodiment.

FIG. 2 is a block diagram of a manufacturing environment depicted in accordance with an illustrative embodiment. Manufacturing environment 200 is one example of an environment in which inspection system 202 may be used to detect surface features of interest on, for example, structure 204 being assembled or built in manufacturing environment 200. In these illustrative examples, inspection system 202 is an automated inspection system.

Structure 204 may take a number of different forms, including an aircraft component. For example, structure 204 may take the form of a fuselage structure, a fuselage panel, a wing structure, a skin panel, a structural beam, a door, a bin, or some other type of structure. Structure 204 has surface 206. Inspection system 202 may be used to detect various types of features of interest on surface 206 of structure 204.

Inspection system 202 includes sensor system 208 and feature detector 210. In this illustrative example, feature detector 210 may be implemented in software, hardware, firmware, or a combination thereof. When software is used, the operations performed by feature detector 210 may be implemented using, for example, without limitation, program code configured to run on a processor unit. When firmware is used, the operations performed by feature detector 210 may be implemented using, for example, without limitation, program code and data and stored in persistent memory to run on a processor unit.

When hardware is employed, the hardware may include one or more circuits that operate to perform the operations performed by feature detector 210. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, feature detector 210 is implemented using computer system 212, which may be in communications with sensor system 208. For example, sensor system 208 and computer system 212 may communicate using any number of wired, wireless, optical, or other types of communications links. Computer system 212 may comprise one computer or multiple computers in communication with each other.

Inspection system 202 may be used to detect features within surface region 214 of surface 206. Surface region 214 is a substantially planar surface in these illustrative examples. For example, surface region 214 may substantially lie along a reference plane. But in other examples, surface region 214 may be a curved surface. In some illustrative examples, surface region 214 may have a large radius of curvature such that the curvature of surface region 214 does not deviate significantly from the reference plane.

Sensor system 208 measures profile 216 of surface region 214 to generate surface data 218. Surface region 214 may be one portion of surface 206 or the entire surface 206. Profile 216 of surface region 214 is the topography, or surface texture, of surface region 214. Surface data 218 may take the form of, for example, point cloud data 220. As one illustrative example, sensor system 208 takes the form of a profilometer, such as an optical profilometer, that is used to scan surface region 214, measure profile 216 of surface region 214, and generate surface data 218 in the form of point cloud data 220, which may form a three-dimensional point cloud. Point cloud data 220 may comprise a plurality of points in a reference coordinate system.

Feature detector 210 receives surface data 218 from sensor system 208 and processes surface data 218. Feature detector 210 generates mesh 222 comprising plurality of mesh elements 224 using surface data 218. Mesh 222 may be a representation of surface region 214. In one illustrative example, feature detector 210 generates mesh 222 by assigning each of the points in point cloud data 220 to a mesh element of mesh 222. For example, mesh 222 may be a two-dimensional grid and each mesh element of plurality of mesh elements 224 may be a rectangular element of the two-dimensional grid. Feature detector 210 assigns each point in point cloud data 220 to a corresponding mesh element of mesh 222 such that one mesh element may be assigned one point or multiple points. Mesh 222 provides a way of sectioning the points of point cloud data 220 such that these points may be more easily managed and processed.

Feature detector 210 computes plurality of normal vectors 226 for plurality of mesh elements 224. In particular, feature detector 210 computes plurality of normal vectors 226 such that plurality of normal vectors 226 includes a normal vector for each mesh element of plurality of mesh elements 224. Plurality of normal vectors 226 may also be referred to as a plurality of surface normals. A surface normal at a location on a surface is a vector that is substantially perpendicular to the plane that is tangent to the surface at the location. For example, a normal vector in plurality of normal vectors 226 for a corresponding mesh element of plurality of mesh elements 224 may be the normal vector computed for a representative plane that is fit to the corresponding mesh element based on a sample of the points assigned to that corresponding mesh element.

In particular, each normal vector of plurality of normal vectors 226 may be a vector in three-dimensional space. For example, each normal vector may be defined by an X component, a Y component, and a Z component for an X-axis, Y-axis, and Z-axis respectively. The X-axis and the Y-axis may define a plane that approximates, or is substantially the same, as the reference plane along which surface region 214 lies. The X component and the Y component of a particular normal vector for a corresponding mesh element define the representative plane for that corresponding mesh element. The Z component is perpendicular to the representative plane for that corresponding mesh element.

If surface region 214 were completely planar and completely smooth with no surface inconsistencies, each of plurality of normal vectors 226 would be in the same direction and each of the representative planes for plurality of mesh elements 224 would lie along a same reference plane. More specifically, the Z component for each of plurality of normal vectors 226 would all be in a same vertical direction that is normal to the reference plane. However, when surface region 214 has a surface inconsistency or a feature such as a substantially conical hole, a portion of the normal vectors will be different. In particular, the Z components for these different normal vectors may not be in a same direction as other Z components.

Feature detector 210 generates distribution 228 for plurality of normal vectors 226. In particular, feature detector 210 generates distribution 228 of Z components 229 for plurality of normal vectors 226. Distribution 228 may be a histogram-type distribution.

Feature detector 210 identifies dominant subset 230 of plurality of mesh elements 224 based on distribution 228 in which a Z component of a corresponding normal vector for each mesh element in dominant subset 230 is in substantially a first direction. In particular, dominant subset 230 of plurality of mesh elements 224 may be the largest group of mesh elements from plurality of mesh elements 224 with substantially uniform corresponding Z components such that the corresponding Z components are substantially all in the first direction. In other words, feature detector 210 identifies main portion 231 of Z components 229 that are substantially in the first direction based on distribution 228. The first direction may be, for example, a substantially vertical direction relative to surface region 214. This first direction defines the reference plane normal for the reference plane along which surface region 214 lies.

Once dominant subset 230 has been identified, feature detector 210 analyzes remaining subset 232 of plurality of mesh elements 224. Remaining subset 232 may include all mesh elements of plurality of mesh elements 224 that do not belong to dominant subset 230. Feature detector 210 may analyze remaining portion 234 of Z components 229 corresponding to remaining subset 232 of the plurality of mesh elements 224 to determine whether feature 236 is present within surface region 214. Feature 236 is a feature of interest.

In some illustrative examples, feature 236 may be a substantially conical hole, such as a countersunk hole. In these examples, feature detector 210 analyzes remaining portion 234 of Z components 229 corresponding to remaining subset 232 of plurality of mesh elements 224 to determine whether there is a region of mesh 222 for which substantially all corresponding Z components for the region are substantially uniform but not in the vertical direction. In other words, feature detector 210 analyzes remaining portion 234 of Z components 229 corresponding to remaining subset 232 of plurality of mesh elements 224 to determine whether substantially all corresponding Z components for a particular region of the mesh are substantially in a second direction that is not the first direction the first direction discussed above. In one illustrative example, any region of mesh 222 for which substantially all corresponding Z components for that region are uniformly in a second direction may indicate the presence of a substantially conical hole. The second direction may also provide the cone angle for the substantially conical hole.

Feature detector 210 may also compute information about the substantially conical hole. For example, once a substantially conical hole has been detected, feature detector 210 may determine the geometry of the substantially conical hole. The geometry may be determined by first determining the cone angle, the radius, and the center of the substantially conical hole. The geometry of the substantially conical hole may be used to model the substantially conical hole and obtain additional information such as, for example, a depth of the substantially conical hole.

In other illustrative examples, feature 236 is a surface texture feature. The surface texture feature may be an undesired surface texture feature such as, but is not limited to, a scratch, a dent, a solvent-created feature, a hammering-created feature, a discoloration, or some other type of surface texture feature. Feature detector 210 analyzes remaining portion 234 of Z components 229 to determine whether any regions of mesh 222 are associated with a random and varied distribution of Z components.

For example, feature detector 210 may apply a clustering algorithm to remaining portion 234 of Z components 229 corresponding to remaining subset 232 of plurality of mesh elements 224 to determine whether any regions of mesh 222 are associated with a random and varied distribution of Z components. If no clusters are generated, then feature detector 210 may determine that no region of mesh 222 indicates the presence of a surface texture feature of interest. However, if applying the clustering algorithm creates one or more clusters of mesh elements where the corresponding Z components for each cluster have a random and varied distribution, each of the one or more clusters indicates the presence of a surface texture feature.

In one illustrative example, when a cluster of mesh elements within a region of mesh 222 is identified, feature detector 210 computes a boundary and a maximum Z value for the region to thereby determine a geometry of the surface texture feature. For example, feature detector 210 may use the boundary and the maximum Z value for the region to determine a size and/or depth of the surface texture feature. Further, feature detector 210 may use the boundary and the maximum Z value for the region to determine whether the surface texture feature is an undesired surface texture feature and if undesired, the severity of the undesired surface texture feature.

Thus, inspection system 202 may be used to detect features on a surface. In particular, inspection system 202 may be used to detect and measure substantially conical holes, such as countersunk holes, and/or to detect the presence of undesired surface texture features. Inspection system 202 provides a system for automating the detection of these features. In some illustrative examples, inspection system 202 may be implemented using a robotic system, an automated guided vehicle (AGV), or some other type of automated system. For example, sensor system 208 may be implemented on an automated guided vehicle. Computer system 212 may be implemented on the automated guided vehicle or at a location remote to the automated guided vehicle. In some illustrative examples, sensor system 208 may be a handheld optical profilometer capable of sending surface data 218 to feature detector 210 over one or more wired and/or wireless communications links.

Sensor system 208 may be capable of continuously generating a stream of point cloud data 220 and feature detector 210 may process point cloud data 220 in real-time or near real-time as the stream of point cloud data 220 is received. Point cloud data 220 for a few square inches of surface may comprise, for example, between about four million to eight million points. In some cases, inspection system 202 may be capable of generating point cloud data 220 for a few square inches and analyzing point cloud data 220 as described above to detect the presence of any undesired features in a matter of seconds. Similarly, inspection system 202 may be capable of generating point cloud data 220 for surface region 214 where one or more countersunk holes are expected and analyzing point cloud data 220 as described above to measure the one or more countersunk holes in a matter of seconds.

The illustration of inspection system 202 in FIG. 2 is not meant to imply physical, functional, or architectural limitations to the manner in which an illustrative embodiment may be implemented. Other components in addition to or in place of the ones illustrated may be used. Some components may be optional. For example, in some cases, the X-component, the Y-component, and the Z-component of each of plurality of normal vectors 226 may be used in a coordinate-independent way to detect feature 236, rather than only relying on the Z-components.

Figure 3:
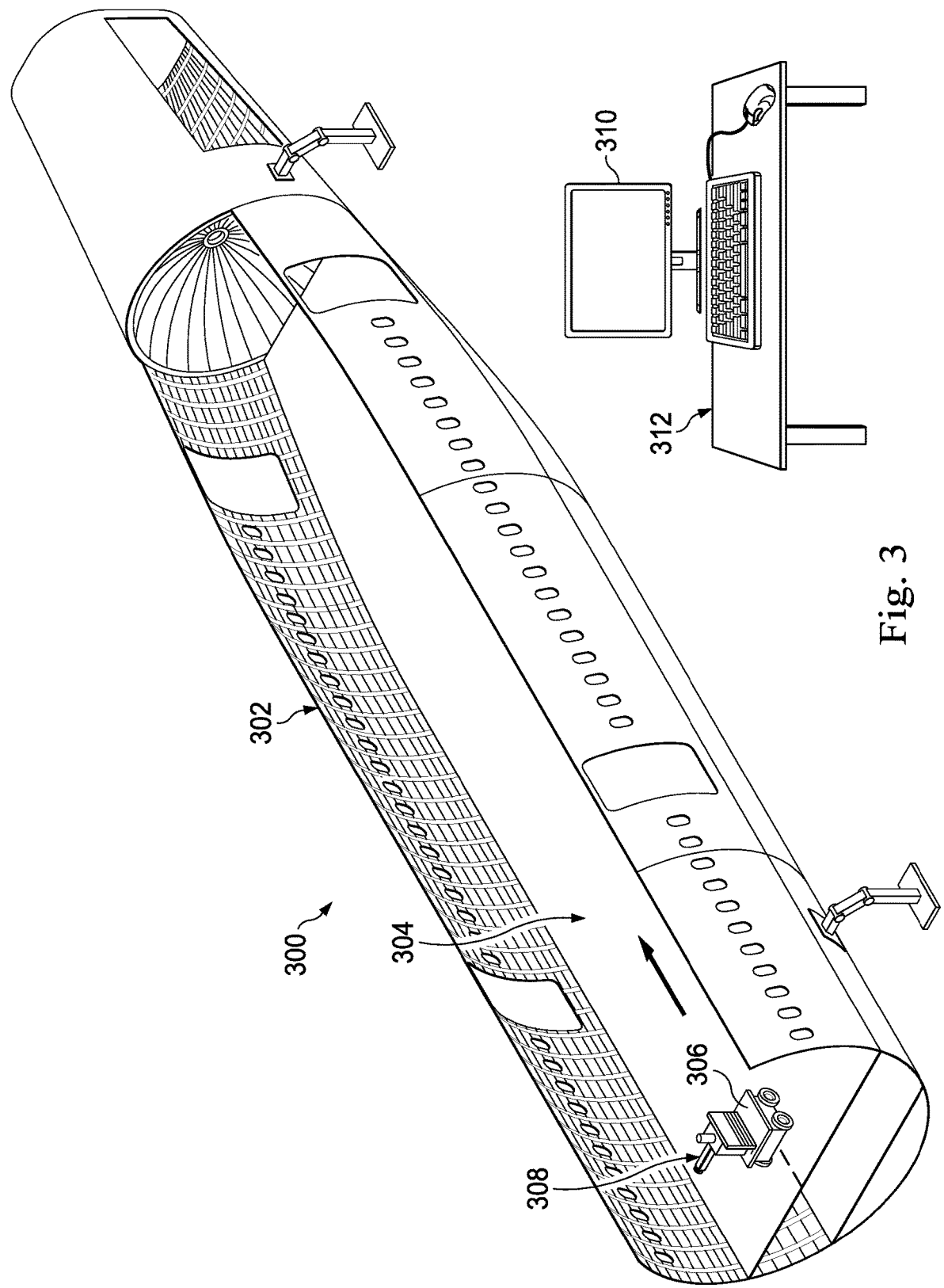
FIG. 3 is an illustration of a perspective view of a fuselage structure and a robotic system being used to inspect the fuselage structure in accordance with an example embodiment.

FIG. 3 is an illustration of a perspective view of a fuselage structure and automated guided vehicle positioned on the fuselage structure, depicted in accordance with an illustrative embodiment. Fuselage structure 300 may be an example of one implementation for structure 204 described in FIG. 2. Further, fuselage structure 300 may be in the middle of an assembly process for building a fuselage, such as fuselage 106 in FIG. 1. Fuselage structure 300 includes plurality of fuselage panels 302. In this illustrative example, fuselage structure 300 may have top fuselage panels that are not shown such that interior 304 of fuselage structure 300 may be better seen.

Automated guided vehicle 306 may move through interior 304 of fuselage structure 300 to perform various inspection operations using sensor system 308 attached to automated guided vehicle 306. Sensor system 308 may be an example of one implementation for sensor system 208 in FIG. 2. Depending on the implementation, sensor system 308 may have one or more degrees of linear freedom, one or more degrees of rotational freedom, or a combination thereof relative to automated guided vehicle 306.

In one illustrative example, automated guided vehicle 306 may be moved through interior 304 of fuselage structure 300 to perform an inspection of one or more surfaces of fuselage structure 300. For example, automated guided vehicle 306 may move through interior 304 of fuselage structure 300 to allow sensor system 308 to measure the profile of the surface of one or more of fuselage panels 302 and generate surface data, such as surface data 218 described in FIG. 2.

In one or more illustrative examples, this surface data is wirelessly communicated to computer system 310 at control station 312 for processing. Computer system 310 may be an example of one implementation for computer system 212 in FIG. 2. A feature detector implemented on computer system may be used to process the surface data and detect the presence of features of interest on the surface of fuselage panels 302. For example, the feature detector may be used to detect and measure countersunk holes that have been drilled in fuselage panels 302 in substantially real-time as automated guided vehicle 306 moves through interior 304 of fuselage structure 300.

As one illustrative example, computer system 310 may receive the surface data continuously as automated guided vehicle 306 moves through interior 304 of fuselage structure 300 scanning the surface. Using the techniques described above in FIG. 2, computer system 310 may be capable of processing the surface data and analyzing one, two, or three countersunk holes in no more than a few seconds. Further, computer system 310 may be capable of processing the surface data and analyzing a few square inches of the surface of a fuselage panel in no more than a few seconds.

In other illustrative examples, the surface data is processed by a processor unit or other type of computer (not shown) that is onboard automated guided vehicle 306 and coupled to sensor system 308. In some cases, the onboard computer may generate an audible or visual alert whenever an undesired surface feature is detected.

Figure 4:
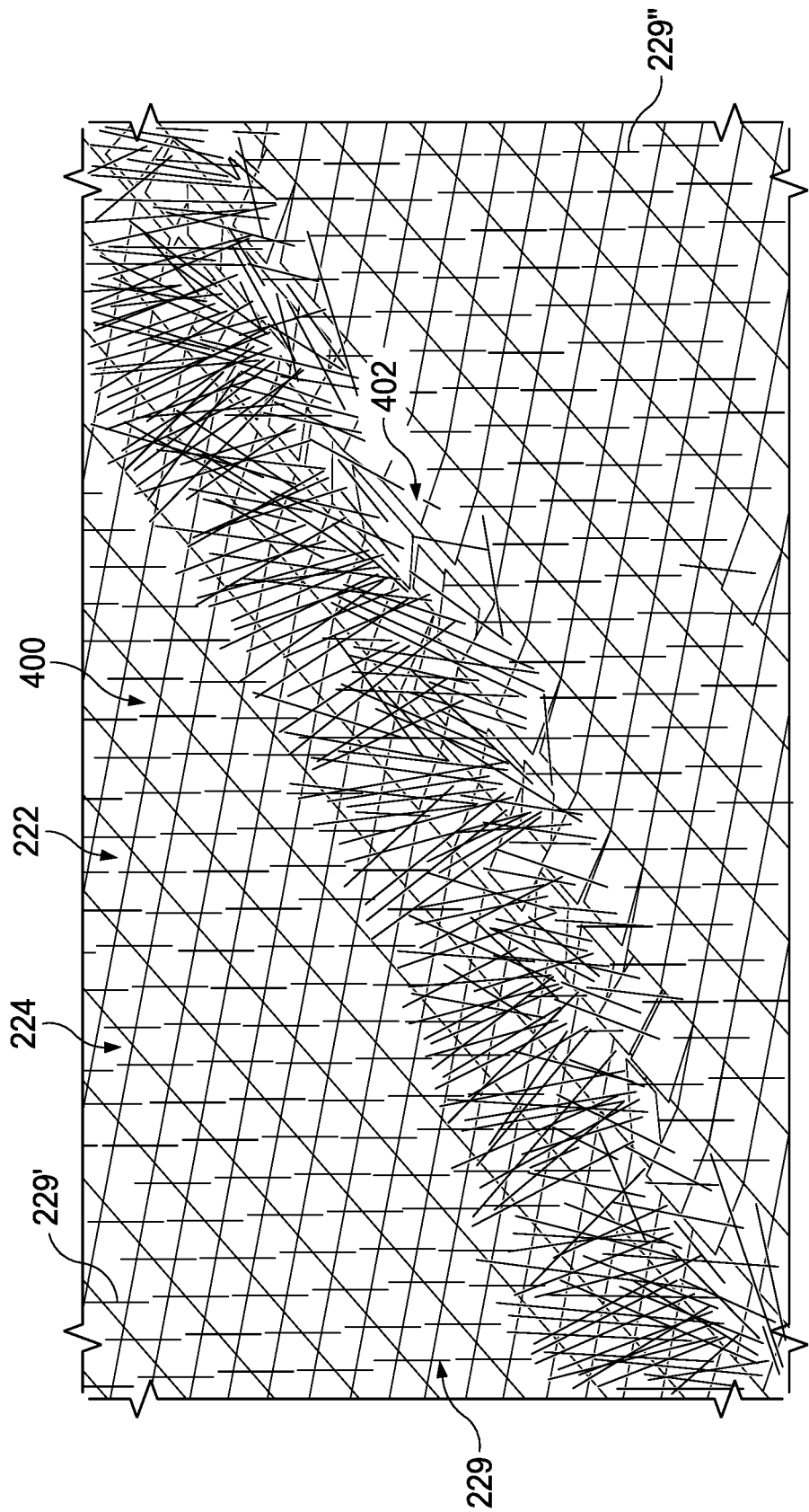
FIG. 4 is an illustration of a portion of one example implementation of the mesh from FIG. 2 in accordance with an example embodiment.

FIG. 4 is an illustration of a portion of one example implementation of mesh 222 from FIG. 2, depicted in accordance with an illustrative embodiment. As depicted, mesh 222 includes plurality of mesh elements 224. Z components 229 (including Z component 229', 229", etc.) are depicted in association with their corresponding mesh elements. A first portion 400 of plurality of mesh elements 224 is associated with Z components in a substantially vertical direction. However, a second portion 402 of plurality of mesh elements 224 is associated with Z components that are random and varying. These random and varying Z components indicate the presence of a surface texture feature. In one illustrative example, the surface texture feature is a scratch.

Figure 5:
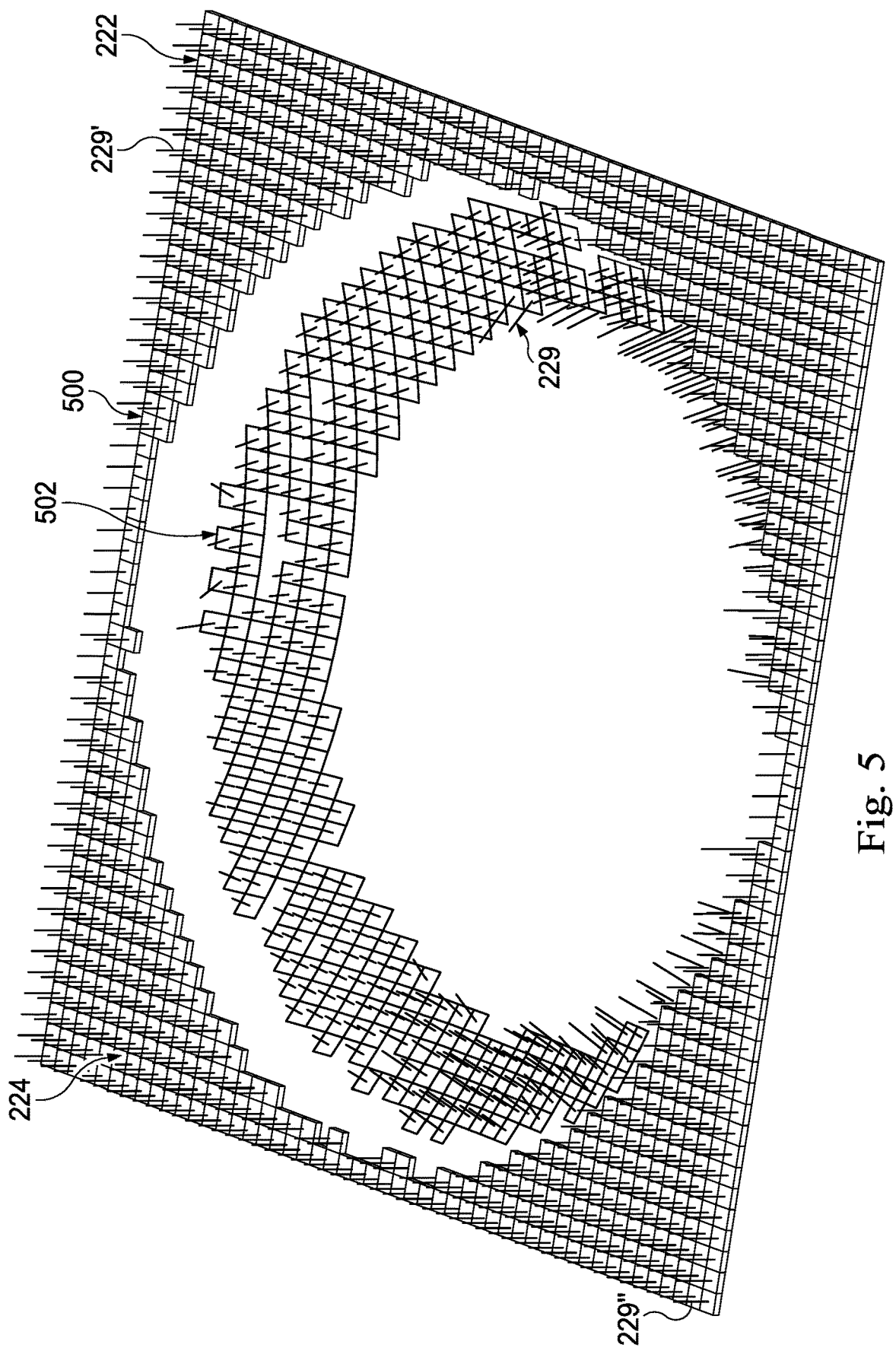
FIG. 5 is an illustration of a portion of another example implementation of the mesh from FIG. 2 in accordance with an example embodiment.

FIG. 5 is an illustration of a portion of another example implementation of mesh 222 from FIG. 2, depicted in accordance with an illustrative embodiment. As depicted, mesh 222 includes plurality of mesh elements 224. Z components 229 (including Z component 229', 229", etc.) are depicted in association with their corresponding mesh elements. A first portion 500 of plurality of mesh elements 224 is associated with Z components that are in a substantially vertical direction. A second portion 502 of plurality of mesh elements 224 is associated with Z components that are substantially uniform in direction but not in the vertical direction. The Z components corresponding to the second portion 502 of plurality of mesh elements 224 indicate the presence of a countersunk hole.

FIG. 6 is a flowchart illustration of a process for detecting a feature of interest on a surface, depicted in accordance with an illustrative embodiment. The process 600 may be implemented using, for example, inspection system 202 described in FIG. 2.

The process 600 may begin by generating surface data for a surface region (step 602). Next, a mesh comprising a plurality of mesh elements is generated using the surface data generated for the surface region (step 604). A plurality of normal vectors is then computed for the plurality of mesh elements (step 606). A distribution for the plurality of normal vectors is generated (step 608). In one illustrative example, in step 608, the distribution is a histogram-type distribution of the Z components of the plurality of normal vectors.

Thereafter, a dominant subset of the plurality of mesh elements is identified based on the distribution in which a Z component of a corresponding normal vector of each mesh element of the dominant subset is in substantially a first direction (step 610). Z components of a portion of the plurality of normal vectors corresponding to a remaining subset of the plurality of mesh elements are analyzed to determine whether the feature is present within the surface region (step 612), with the process terminating thereafter. The feature may be, for example, a substantially conical hole or a surface texture feature.

FIG. 7 is a flowchart illustration of a process for computing and analyzing normal vectors for a surface region, depicted in accordance with an illustrative embodiment. The process 700 may be implemented using, for example, inspection system 202 described in FIG. 2. More particularly, the process 700 may be implemented using sensor system 208 and feature detector 210 described in FIG. 2.

The process 700 may begin by measuring a profile of a surface region using a sensor system to generate point cloud data for the surface region (step 702). In one illustrative example, step 702 is performed using a profilometer. Next, a mesh comprising a plurality of mesh elements is generated in which each point in the point cloud data is assigned to a corresponding mesh element of the plurality of mesh elements (step 704).

Thereafter, a plurality of normal vectors is computed for the plurality of mesh elements (step 706). For example, in step 706, a mesh element may be selected from the plurality of mesh elements for processing. In step 706, a sample of or all of the points assigned to the selected mesh element may be fit to a representative plane and a surface normal for the representative plane may then be identified. The surface normal identified may include an X component, a Y component, and a Z component.

Next, a distribution of the Z components of the plurality of normal vectors is generated (step 708). In step 708, the distribution may be a histogram-type distribution. A main portion of the Z components that are substantially in a first direction is identified based on the distribution, where the main portion of the Z components belong to a dominant subset of the plurality of mesh elements (step 710). In other words, in step 710, the largest group of substantially uniform Z components that are substantially all in a same first direction is identified. Thereafter, a remaining portion of the Z components are analyzed based on the distribution to determine whether a feature is present within the surface region, where the remaining portion of the Z components belong to a remaining subset of the plurality of mesh elements (step 712), with the process terminating thereafter.

In some illustrative examples, in step 712, the analysis may reveal that a finer level of detail is needed in order to identify information about a feature of interest that is detected. In these examples, the process 700 may then also include, as part of step 712, or as an additional step, dividing each mesh element of the remaining subset into a plurality of elements to thereby create a new plurality of mesh elements; computing a new plurality of normal vectors for the new plurality of mesh elements; generating a new distribution for the new plurality of normal vectors; and analyzing the new distribution for the new plurality of normal vectors to identify information about the feature within the surface region. In some cases, this portion of the process may be repeated to obtain an even finer level of detail for identifying information about the feature.

Figure 8:
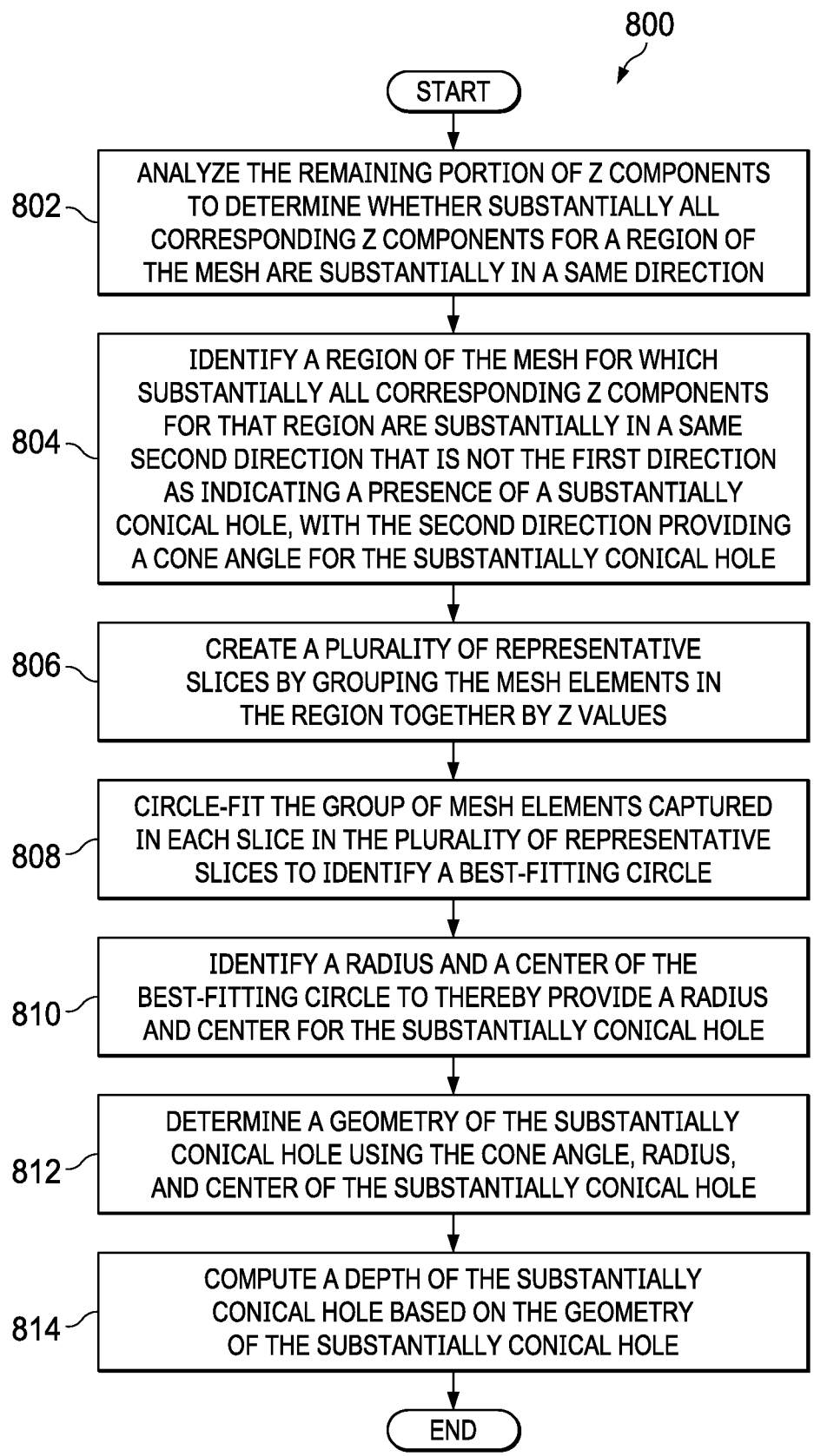
FIG. 8 is a flowchart illustration of a process for detecting a presence of and measuring a substantially conical hole based on the surface normals in accordance with an example embodiment.

FIG. 8 is a flowchart illustration of a process for detecting a presence of and measuring a substantially conical hole based on the Z components of surface normals, depicted in accordance with an illustrative embodiment. The process 800 may be implemented using, for example, inspection system 202 described in FIG. 2. More particularly, the process 800 may be implemented using feature detector 210 described in to FIG. 2. Further, the process 800 is an example of one manner in which step 712 in FIG. 7 may be implemented.

The process 800 may begin by analyzing the remaining portion of Z components to determine whether substantially all corresponding Z components for a region of the mesh are substantially in a same direction (step 802). A region of the mesh for which substantially all corresponding Z components for that region are substantially in a same second direction that is not the first direction is identified as indicating a presence of a substantially conical hole, with the second direction providing a cone angle for the substantially conical hole (step 804). In step 804, any number of regions meeting the specified criteria may be identified as indicating a presence of a substantially conical hole.

Thereafter, a plurality of representative slices are created by grouping the mesh elements in the region together by Z values (step 806). For example, each slice may comprise a group of mesh elements in the region that share substantially same Z values. Next, the group of mesh elements captured in each slice in the plurality of representative slices is circle-fit to identify a best-fitting circle (step 808). Then a radius and a center of the best-fitting circle are identified to thereby provide a radius and center for the substantially conical hole (step 810). A geometry of the substantially conical hole is determined using the cone angle, radius, and center of the substantially conical hole (step 812). A depth of the substantially conical hole is computed based on the geometry of the substantially conical hole (step 814), with the process terminating thereafter. In one illustrative example, steps 812 and 814 may be performed based on modeling of the substantially conical hole using the identified cone angle, radius, and center of the substantially conical hole.

Figure 9:
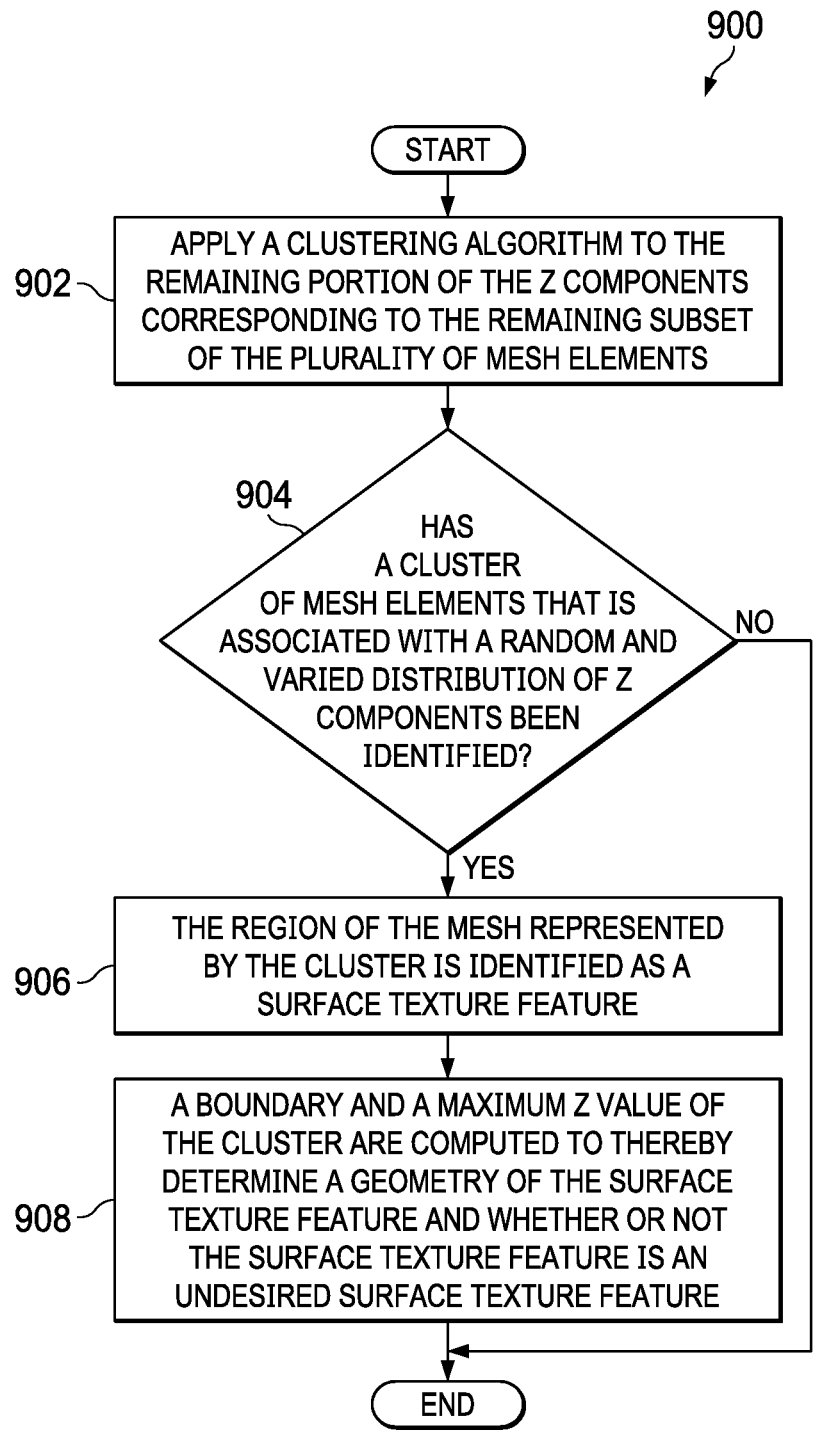
FIG. 9 is a flowchart illustration of a process for detecting a presence of a surface texture feature based on the surface normals in accordance with an example embodiment.

FIG. 9 is a flowchart illustration of a process for detecting a presence of a surface texture feature based on the Z components of surface normals, depicted in accordance with an illustrative embodiment. The process 900 may be implemented using, for example, inspection system 202 described in FIG. 2. More particularly, the process 900 may be implemented using feature detector 210 described in FIG. 2. Further, the process 900 is an example of one manner in which step 712 in FIG. 7 may be implemented.

The process 900 may begin by applying a clustering algorithm to the remaining portion of the Z components corresponding to the remaining subset of the plurality of mesh elements (step 902). A determination is made as to whether a cluster of mesh elements that is associated with a random and varied distribution of Z components is identified (step 904). If no clusters are identified, the process terminates. If a cluster is identified, the region of the mesh represented by the cluster is identified as a surface texture feature (step 906). Next, a boundary and a maximum Z value of the cluster are computed to thereby determine a geometry of the surface texture feature and whether or not the surface texture feature is an undesired surface texture feature (step 908), with the process terminating thereafter.

Figure 10:
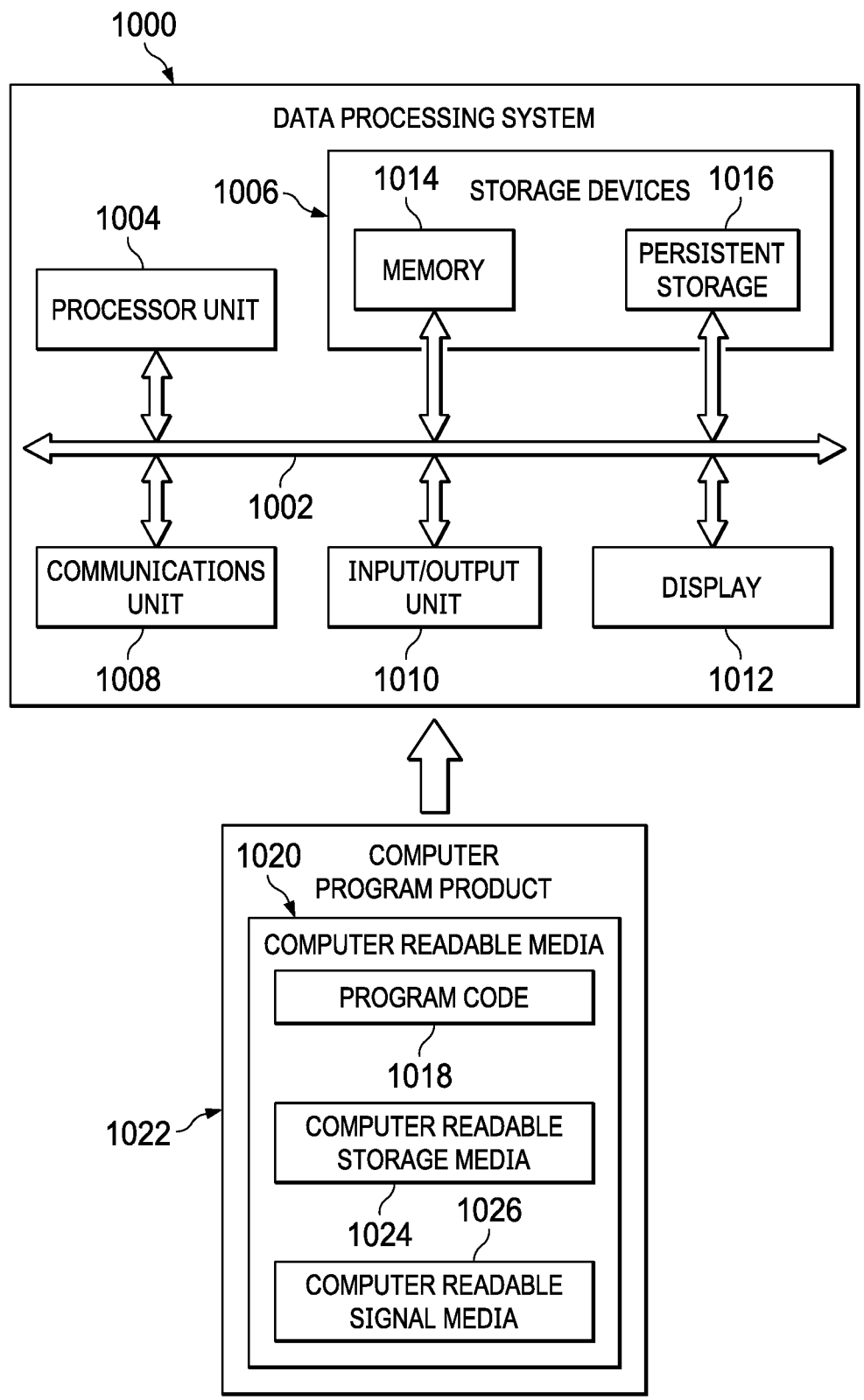
FIG. 10 is a block diagram of a data processing system in accordance with an example embodiment.

FIG. 10 is a block diagram of a data processing system, depicted in accordance with an illustrative embodiment. Data processing system 1000 may be used to implement feature detector 210 in FIG. 2 and/or computer system 212 in FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
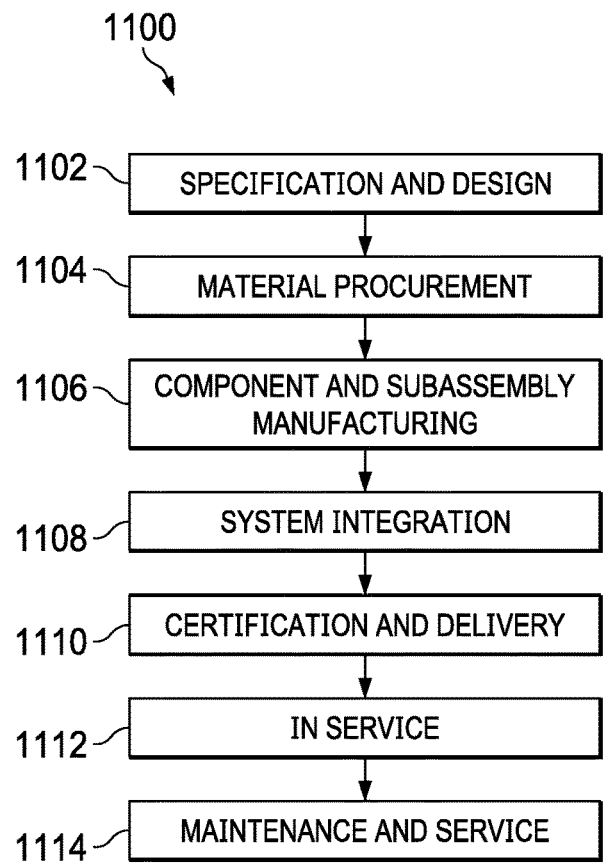
FIG. 11 is a block diagram of an aircraft manufacturing and service method in accordance with an example embodiment.
Figure 12:
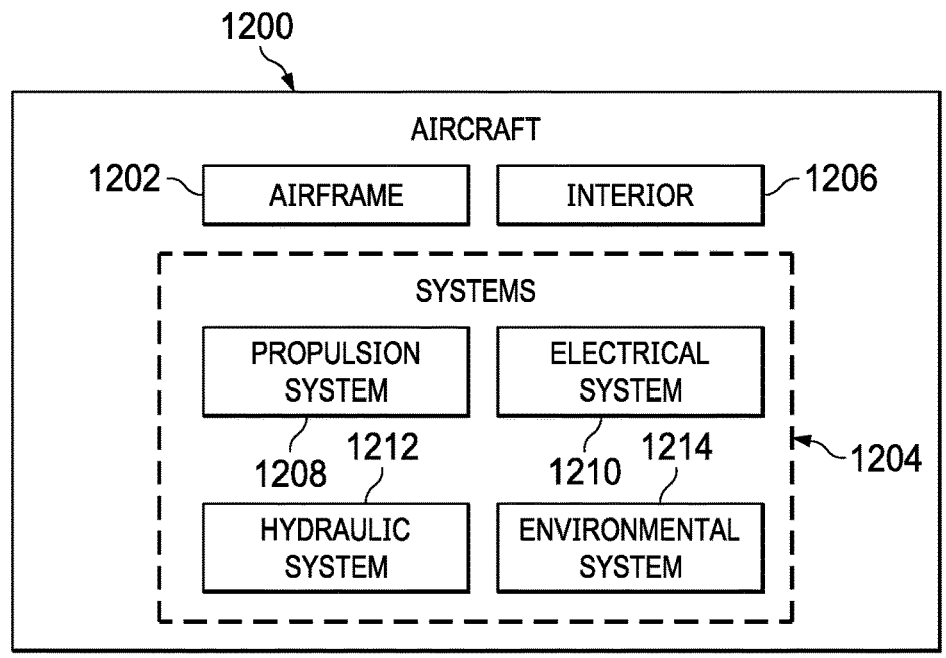
FIG. 12 is a block diagram of an aircraft in accordance with an example embodiment.

Illustrative embodiments of the disclosure may be described in the context of aircraft manufacturing and service method 1100 as shown in FIG. 11 and aircraft 1200 as shown in FIG. 12. FIG. 11 is a block diagram of an aircraft manufacturing and service method, depicted in accordance with an illustrative embodiment. Aircraft manufacturing and service method 1100 may be used to manufacture, for example, aircraft 100 in FIG. 1. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

FIG. 12 is a block diagram of an aircraft, depicted in accordance with an illustrative embodiment. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In particular, inspections performed using inspection system 202 from FIG. 2 may be performed during any one of the stages of aircraft manufacturing and service method 1100. For example, without limitation, inspection system 202 in FIG. 2 may be used to perform automated inspections for a structure of aircraft 1200 during at least one of component and subassembly manufacturing 1106, system integration 1108, routine maintenance and service 1114, or some other stage of aircraft manufacturing and service method 1100. Further, inspection system 202 may be used to inspect one or more surfaces of aircraft 1200 including, but not limited to, the surfaces of structures that form airframe 1202 and interior 1206.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting a feature on a surface, the method comprising:
   generating, by a computer system, a mesh comprising a plurality of mesh elements using surface data generated for a surface region;
   computing, by the computer system, a plurality of normal vectors for the plurality of mesh elements;
   generating, by the computer system, a distribution for the plurality of normal vectors;
   identifying, by the computer system, a dominant subset of the plurality of mesh elements based on the distribution in which a Z component of a corresponding normal vector of each mesh element of the dominant subset is in substantially a first direction; and
   analyzing, by the computer system, Z components of a portion of the plurality of normal vectors corresponding to a remaining subset of the plurality of mesh elements to determine whether the feature is present within the surface region,
   wherein analyzing the Z components comprises:
   analyzing, by the computer system the remaining subset of the plurality of mesh elements to determine whether substantially all corresponding Z components for a region of the mesh are substantially in a same direction that is not the first direction; and
   identifying, by the computer system, the region of the mesh as representing a substantially conical hole within the surface region when substantially all corresponding Z components for the region of the mesh are substantially in a second direction that is not the first direction.

2. The method of claim 1, wherein computing the plurality of normal vectors comprises:
   selecting, by the computer system, a mesh element from the plurality of mesh elements for processing;
   fitting, by the computer system, a sample of a portion of the surface data assigned to the selected mesh element to a representative plane; and computing, by the computer system, the normal vector for the representative plane.

3. The method of claim 2, wherein computing the plurality of normal vectors comprises:
repeating the steps of selecting the mesh element, fitting the sample of the portion of the surface data corresponding to the selected mesh element to the representative plane; and computing the normal vector for each remaining mesh element of the plurality of mesh elements.

4. The method of claim 1 further comprising:
determining, by the computer system, geometry of the substantially conical hole.

5. The method of claim 4, wherein determining the geometry of the substantially conical hole comprises:
determining, by the computer system, an angle, a radius, and a center of the substantially conical hole.

6. The method of claim 1 further comprising:
measuring, by a sensor system, a profile of the surface region to generate the surface data, wherein the surface data is a three-dimensional point cloud.

7. The method of claim 6, wherein generating the mesh comprises:
assigning, by the computer system, each point of the three-dimensional point cloud to one of the plurality of mesh elements.

8. The method of claim 1 further comprising:
responsive to detecting the feature, performing an operation using a tool at a location of the feature on the surface region to at least one of reduce a prominence of the feature, remove the feature, measure dimensions of the feature, image the feature, or transform the feature.

9. The method of claim 1, wherein the feature is selected from one of a scratch, a dent, a solvent-created feature, a hammering-created feature, a discoloration, or a surface texture feature.

10. A method for detecting a feature on a surface, the method comprising:
generating, by a computer system, a mesh comprising a plurality of mesh elements using surface data generated for a surface region;
computing, by the computer system, a plurality of normal vectors for the plurality of mesh elements;
generating, by the computer system, a distribution for the plurality of normal vectors;
identifying, by the computer system, a dominant subset of the plurality of mesh elements based on the distribution in which a Z component of a corresponding normal vector of each mesh element of the dominant subset is in substantially a first direction; and
analyzing, by the computer system, Z components of a portion of the plurality of normal vectors corresponding to a remaining subset of the plurality of mesh elements to determine whether the feature is present within the surface region,
wherein analyzing the Z components comprises:
applying, by the computer system, a clustering algorithm to the Z components corresponding to the remaining subset of the plurality of mesh elements to determine whether any regions of the mesh are associated with a random and varied distribution of Z components; and
identifying, by the computer system, a region of the mesh as representing a surface texture feature in response to a determination that the region is associated with the random and varied distribution of Z components.

11. The method of claim 10 further comprising:
computing, by the computer system, a boundary of the region and a maximum Z value for the region to thereby determine a geometry of the surface texture feature.

12. A method for detecting a feature on a surface, the method comprising:
generating, by a computer system, a mesh comprising a plurality of mesh elements using surface data generated for a surface region;
computing, by the computer system, a plurality of normal vectors for the plurality of mesh elements;
generating, by the computer system, a distribution for the plurality of normal vectors;
identifying, by the computer system, a dominant subset of the plurality of mesh elements based on the distribution in which a Z component of a corresponding normal vector of each mesh element of the dominant subset is in substantially a first direction;
analyzing, by the computer system, Z components of a portion of the plurality of normal vectors corresponding to a remaining subset of the plurality of mesh elements to determine whether the feature is present within the surface region;
dividing, by the computer system, each mesh element of the remaining subset into a plurality of elements to thereby create a new plurality of mesh elements;
computing, by the computer system, a new plurality of normal vectors for the new plurality of mesh elements;
generating, by the computer system, a new distribution for the new plurality of normal vectors; and
analyzing, by the computer system, the new distribution for the new plurality of normal vectors to identify information about the feature within the surface region.

13. An apparatus comprising:
a profilometer that measures a profile of a surface region to generate surface data;
a computer system that receives the surface data; generates a mesh comprising a plurality of mesh elements using the surface data generated for a surface region; computes a plurality of normal vectors for the plurality of mesh elements; generates a distribution for the plurality of normal vectors; identifies a dominant subset of the plurality of mesh elements in which a Z component of a corresponding normal vector of each mesh element of the dominant subset is in substantially a first direction; and analyze Z components of a portion of the plurality of normal vectors corresponding to a remaining subset of the plurality of mesh elements to determine whether a feature is present within the surface region.

14. The apparatus of claim 13, wherein the surface region belongs to an aircraft component and wherein the feature is selected from one of a substantially conical hole, scratch, a dent, a solvent-created feature, a hammering-created feature, a discoloration, or a surface texture feature.

15. The apparatus of claim 13, wherein a substantially conical hole is detected at a region of the mesh when substantially all corresponding Z components for the region of the mesh are substantially in a second direction that is not the first direction.

16. The apparatus of claim 13, wherein a surface texture feature is detected when a region of the mesh is associated with a random and varied distribution of Z components.

17. A method for detecting a feature on a surface, the method comprising:
scanning a surface region of an aircraft structure using a sensor system to generate point cloud data;

generating a mesh comprising a plurality of mesh elements in which each point in the point cloud data is assigned to a mesh element in the plurality of mesh elements;

computing a plurality of normal vectors for the plurality of mesh elements;

generating a distribution of Z components for the plurality of normal vectors;

identifying a main portion of the Z components that are substantially in a first direction based on the distribution;

analyzing a remaining portion of the Z components based on the distribution to determine whether the feature is present within the surface region, wherein a substantially conical hole is detected at a region of the mesh when substantially all corresponding Z components for the region are substantially in a second direction that is not the first direction; and wherein a surface texture feature is detected at the region of the mesh when the region is associated with a random and varied distribution of Z components.

* * * * *